(12) United States Patent
An et al.

(10) Patent No.: US 8,208,210 B2
(45) Date of Patent: Jun. 26, 2012

(54) CAMERA MODULE WITH DOUBLE BARRELS

(75) Inventors: Bok Sun An, Gyunggi-do (KR); Moon Do Yi, Gyunggi-do (KR); Oleg Konevsky, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 344 days.

(21) Appl. No.: 12/320,992

(22) Filed: Feb. 10, 2009

(65) Prior Publication Data

US 2010/0103540 A1    Apr. 29, 2010

(30) Foreign Application Priority Data

Oct. 28, 2008    (KR) ........................ 10-2008-0105801

(51) Int. Cl.
*G02B 7/02*  (2006.01)
*G02B 15/14*  (2006.01)
*G02B 13/08*  (2006.01)

(52) U.S. Cl. ........ 359/823; 359/822; 359/829; 359/668; 359/704; 359/826

(58) Field of Classification Search .................. 359/829, 359/703, 704, 819; 396/529–533
See application file for complete search history.

(56) References Cited

U.S. PATENT DOCUMENTS

| | | | | |
|---|---|---|---|---|
| 3,761,162 A * | 9/1973 | Hall | ............................... | 359/823 |
| 4,154,510 A * | 5/1979 | Katagiri | ........................ | 359/826 |
| 4,210,387 A * | 7/1980 | Ogawa | .......................... | 359/823 |
| 5,305,145 A * | 4/1994 | Tanaka | .......................... | 359/819 |
| 6,507,700 B1 * | 1/2003 | Takekuma et al. | .............. | 396/25 |
| 7,422,382 B2 * | 9/2008 | Seo | ............................... | 359/829 |
| 2007/0076305 A1 * | 4/2007 | Kuroda et al. | ................ | 359/726 |

* cited by examiner

*Primary Examiner* — Ricky Mack
*Assistant Examiner* — Zachary Wilkes

(57) ABSTRACT

A camera module with double barrels, which has an anamorphic lens structure, includes: a first lens barrel containing a plurality of lenses and at least one anamorphic lens for focusing an image of an object at a position inside the camera module; a second lens barrel surrounding a portion of the first lens barrel and separately rotating from the first lens barrel; a housing coupled in a screwed manner to the second lens barrel for focusing of the first lens barrel; and a circuit board on which an image sensor for converting the image received by the first lens barrel to an electrical signal is provided and which is electrically connected to the camera module.

6 Claims, 5 Drawing Sheets

CAMERA MODULE WITH DOUBLE BARRELS

CROSS REFERENCE TO RELATED APPLICATION(S)

This application claims the benefit of Korean Patent Application No. 10-2008-0105801, filed on Oct. 28, 2008, entitled "CAMERA MODULE COMPRISING THE DOUBLE BARRALS", which is hereby incorporated by reference in its entirety into this application.

BACKGROUND OF THE INVENTION

1. Field of the Invention

The present invention relates to a camera module with double barrels, and more particularly to a camera module with double barrels which can eliminate a problem in that part of an image is cut off when adjusting the focus of a camera for a vehicle which uses a specific lens called an anamorphic lens which is asymmetric with respect to an axis.

2. Description of the Related Art

Generally, a lens used in a camera module is symmetric with respect to a central axis and focusing of the lens is performed by rotating a screw provided to a body of a lens barrel. When using the general lens of which the shape is symmetric with respect to a central axis, image loss does not occur because rotation does not occur.

However, when adjusting the focus of a camera using the anamorphic lens which is developed to obtain an image with no distortion, rotation occurs and therefore part of the image is cut off because the anamorphic lens is asymmetric.

FIG. 5 shows a known camera module. Focusing of the lens of the camera using a general lens is performed by rotating a screw provided to a body of a lens barrel. Since the general lens has a symmetric shape, rotation does not occur and the image loss does not occur. On the other hand, since the camera module for a vehicle uses a specific lens called anamorphic lens to obtain a less-distorted image, it is difficult to precisely focus the lens because the lens shape is asymmetric and therefore the rotation and image loss occur when the focusing is performed by rotating the screw of the lens barrel.

The known camera module shown in FIG. 5 includes a lens barrel 10 in which a plurality of lenses is embedded, a housing 20 which is rectangular parallelopiped and encases and protects the lens barrel 10, an image sensor 30, and a circuit board 40 combined with the image sensor 30.

The inside of the lens barrel 10 is provided with a plurality of general lenses 11. Since the general lens 11 is symmetric with respect to a central axis thereof, the rotation does not occur when focusing the lenses by rotating the lens barrel 10 and therefore the image loss also does not occur. Accordingly, it is easy to focus the lens by rotating the screw of the lens barrel 10.

The housing 20 encases and protects the lens barrel 10 and is coupled to the circuit board 40 to also protect the image sensor 30. A portion of the inside surface of the housing 20 which is to be coupled to the lens barrel 10 is provided with screw grooves which engage with screw threads of the lens barrel 10. The housing 20 has a box shape.

The image sensor 30 is a device for converting an image of an object projected through the lens barrel to an electrical signal, is installed at a center portion of the circuit board 40, and is electrically connected to one edge of the circuit board 40 through a wire-bonding method.

The circuit board 40 is a unit for transmitting the electrical signal generated by the image sensor 30 to a vehicle-specific camera module or a camera phone and an upper surface of the circuit board 40 is provided with the image sensor 30 and circuits to which various passive elements are electrically connected.

In conclusion, the known camera module has the general lens 11 which is symmetric with respect to the central axis thereof. Accordingly, focusing of the lens of the camera is performed by rotating the screw of the lens barrel. Since the lens is a symmetric lens, the rotation does not occur and therefore the image loss does not occur.

On the other hand, as for the vehicle-specific camera module, the specific lens called Anamorphic is used to reduce distortion of the image. Since the specific lens is asymmetric with respect to the central axis thereof, rotation occurs, resulting in image loss in the case of focusing the lens according to the known focus adjusting method. In order to solve this problem, various efforts have been made. That is, when focusing the lens of a camera module with a single barrel, a plate having a predetermined thickness is provided between the barrel and a film or the barrel and an image surface of an imaging element, or a screw or a cam is used to focus the lens of the camera.

Such a focusing manner is effective for focusing a center portion of the lens but resolution of up, down, left, and right side portions of the lens fluctuate according to processing and assembly errors.

Accordingly, a user must dissemble, rotate, and reassemble the barrel or replace the lens group with another one, and then test the lens of the camera to obtain allowable resolution of the peripheral portions of the lens. It is troublesome and takes a lot of labor and time, resulting in a decrease in productivity.

Accordingly, improvement of a barrel structure and a focusing method of a camera which effectively focus the anamorphic lens has been long longed for.

SUMMARY OF THE INVENTION

The invention is made in view of the above-mentioned problems and an object of the invention is to provide a camera module with double barrels which makes lens focusing easy and which can prevent image loss from occurring by virtue of using a double barrel structure to eliminate the image loss problem which has occurred when focusing a lens in a vehicle-specific camera using a specific lens called anamorphic which is asymmetric with respect to a central axis.

In order to accomplish such an object of the invention, according to one aspect of the invention, there is provided a camera module with double barrels and an asymmetric lens, including a first lens barrel containing a plurality of lenses and at least one asymmetric lens for focusing an image of an object at a position inside the camera module; a second lens barrel surrounding a portion of the first lens barrel and separately rotating from the first lens barrel; a housing coupled in a screwed manner to the second lens barrel for focusing of the first lens barrel; and a circuit board on which an image sensor for converting the image received by the first lens barrel to an electrical signal is provided and which is electrically connected to the camera module, and which is connected to a control portion of the camera module, in which the first lens barrel independently rotates from the second lens barrel for horizontal adjustment of the asymmetric lens and the second lens barrel moves in an optical axis direction of the lens for focusing the first lens barrel.

In the camera module with double barrels, it is preferable that the first lens barrel be provided with a pin which transfers force generated when the first lens barrel is rotated to the second lens barrel.

In the camera module with double barrels, it is preferable that the second lens barrel be provided with an adjustment groove into which the pin of the first lens barrel is inserted and rotates and the adjustment groove has a semicircular shape.

In the camera module with double barrels, it is preferable that the first lens barrel, the second lens barrel, and the housing are bonded to one another after focusing of the lenses of the camera module is finished, so that the entire body of the camera module is unseparable and becomes waterproof.

In the camera module with double barrels, it is preferable that the first lens barrel be provided with a protrusion at an end portion thereof to prevent the second lens barrel from being detached therefrom, and that the second lens barrel is provided with an elastic piece and adjustment notches at an end portion thereof so that the first lens barrel is easily inserted into the second lens barrel.

The invention provides the camera module having a double barrel structure in which at least one lens of a plurality of lenses is a specific lens which is asymmetric with respect to a central axis. The camera module has the double barrel structure including the first lens barrel and the second lens barrel to eliminate the problem where rotation and image loss occur when focusing the lens of a camera. The camera module with the double barrels allows the focusing of the lens to be easily performed and can prevent the rotation and image loss from occurring.

According to the camera module with two lens barrels which enables easy focusing and resolution adjustment, the camera module is assembled after the horizontal adjustment is performed by fixing the first lens barrel with the camera lens group to the second lens barrel and rotating independently from the second lens barrel and the focusing and resolution adjustment are precisely performed by rotating the second lens barrel. According to the invention, it is possible to improve the reliability of the camera.

Furthermore, according to the invention, since the camera can be produced by adjusting the first lens module and the second lens module in a simple manner when manufacturing the camera module whose focus and resolution of the lens group for the camera can be extremely precisely adjusted, it is possible to decrease manufacturing time and cost.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
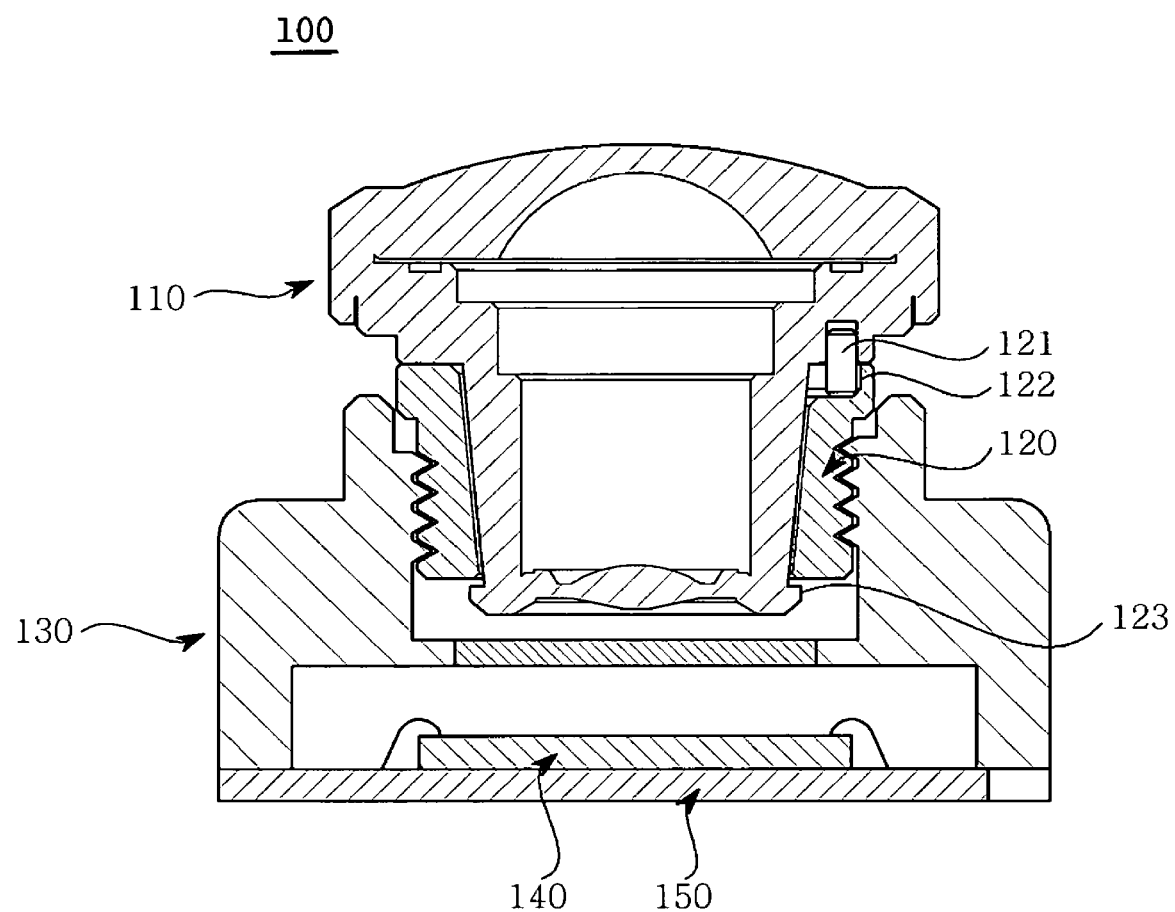
FIG. 1 is a schematic sectional view illustrating a camera module with double barrels according to one embodiment of the invention.

Reference will now be made in greater detail to exemplary embodiments of the invention, an example of which is illustrated in the accompanying drawings. Wherever possible, the same reference numerals will be used throughout the drawings and the description to refer to the same or like parts.

Figure 2:
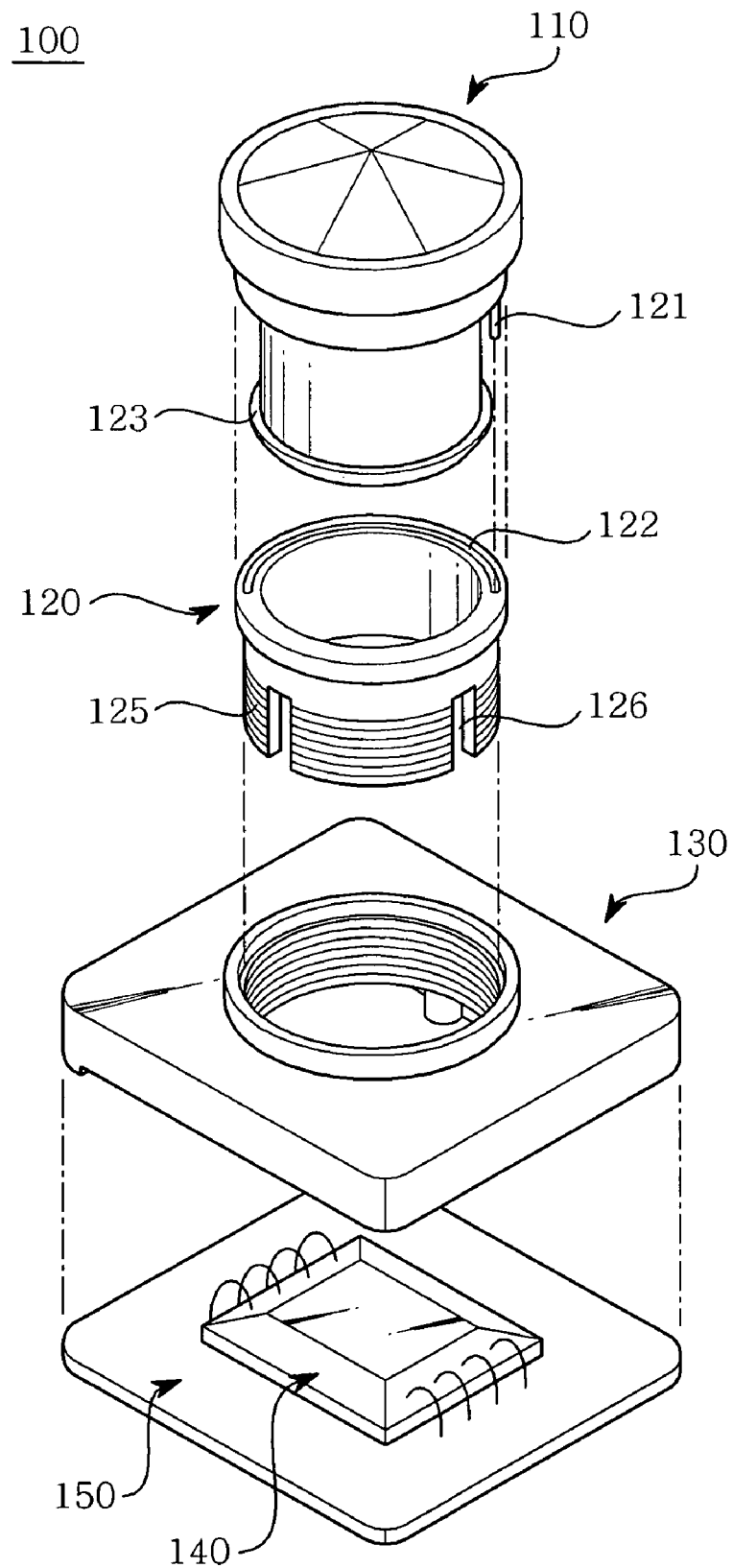
FIG. 2 is a view illustrating the camera module with double barrels and an asymmetric lens according to the embodiment of the invention.
Figure 3:
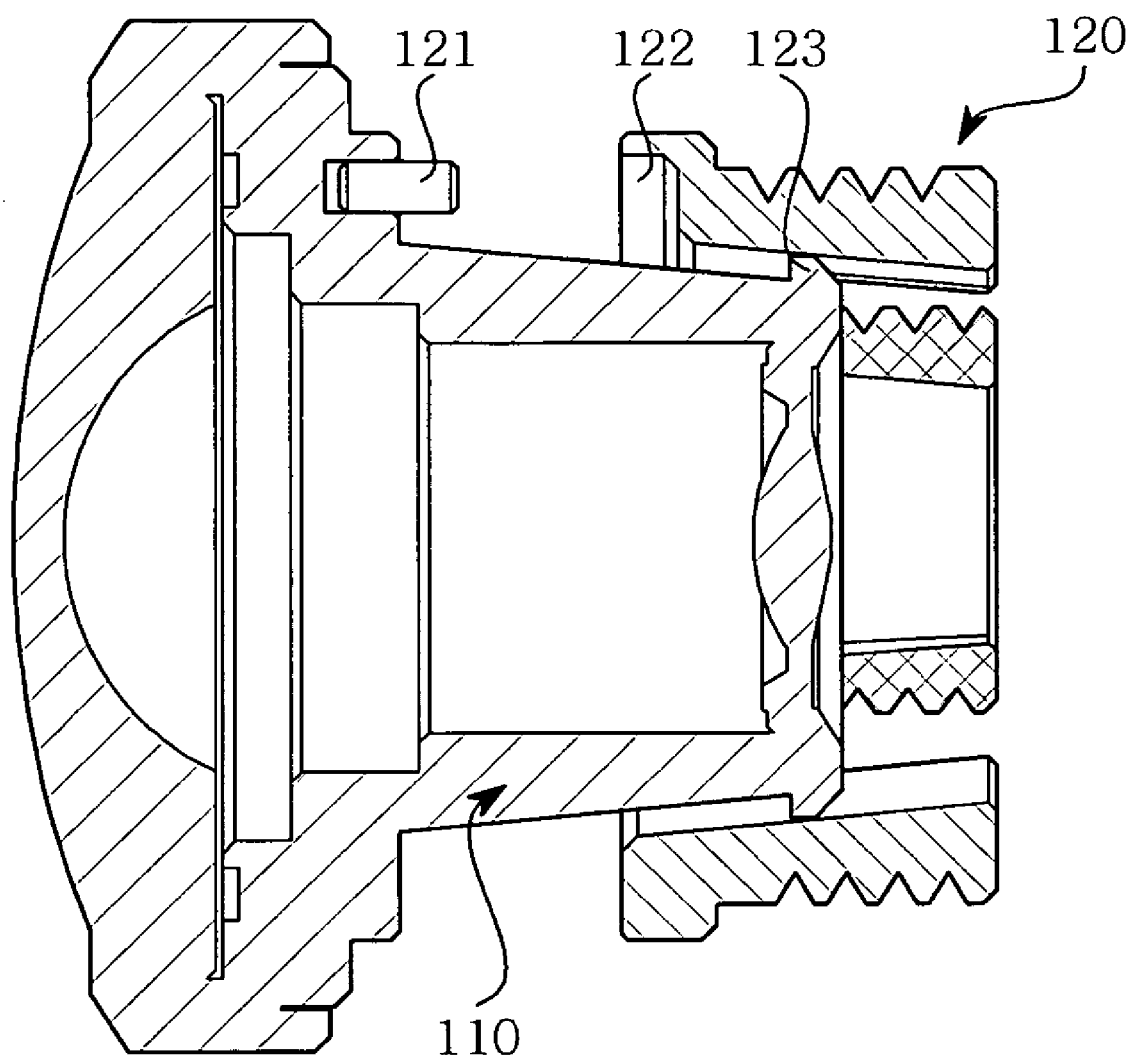
FIG. 3 is a sectional view illustrating the camera module according to another embodiment of the invention.
Figure 4:
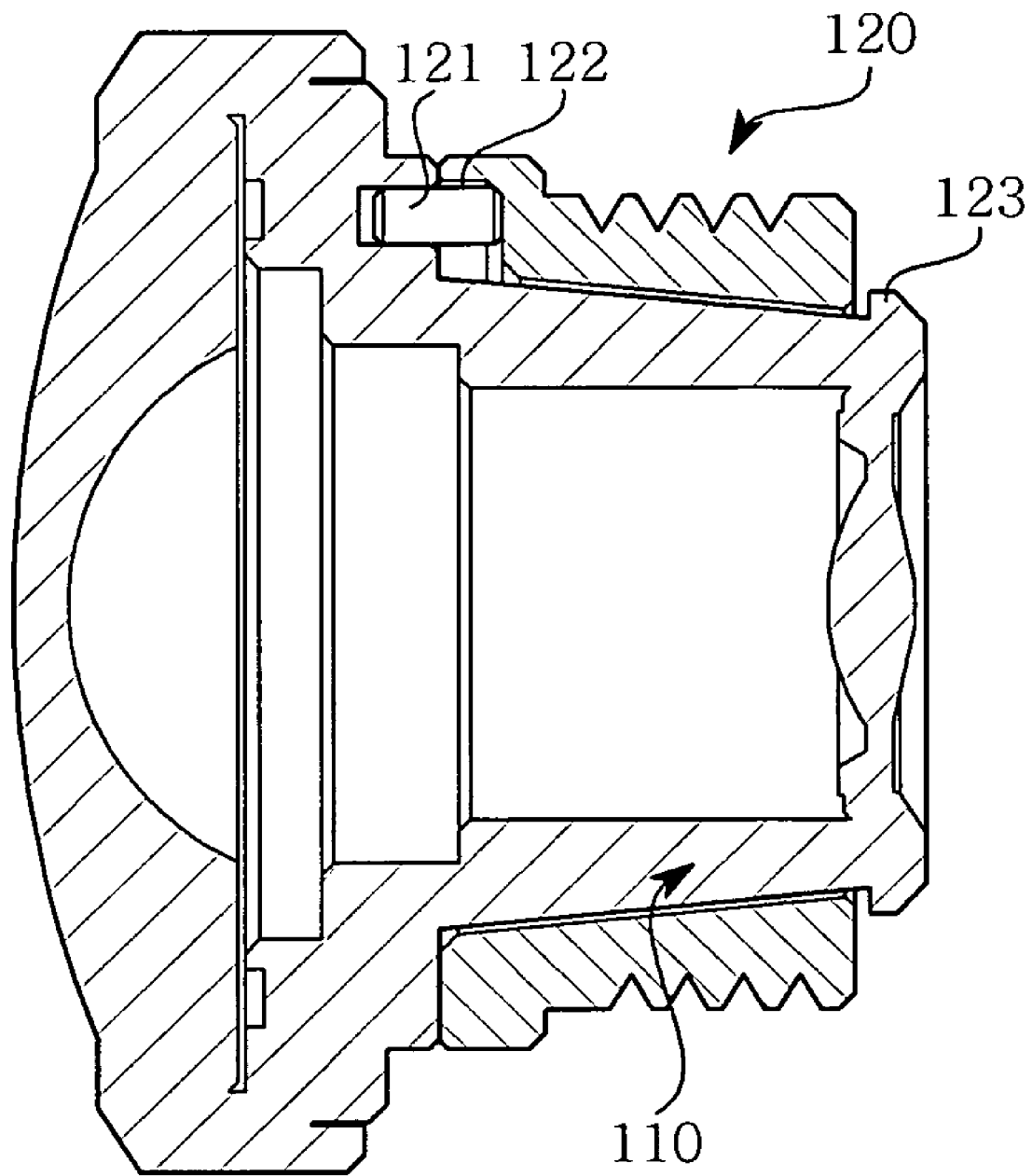
FIG. 4 is a sectional view illustrating the camera module according to a further embodiment of the invention.
Figure 5:
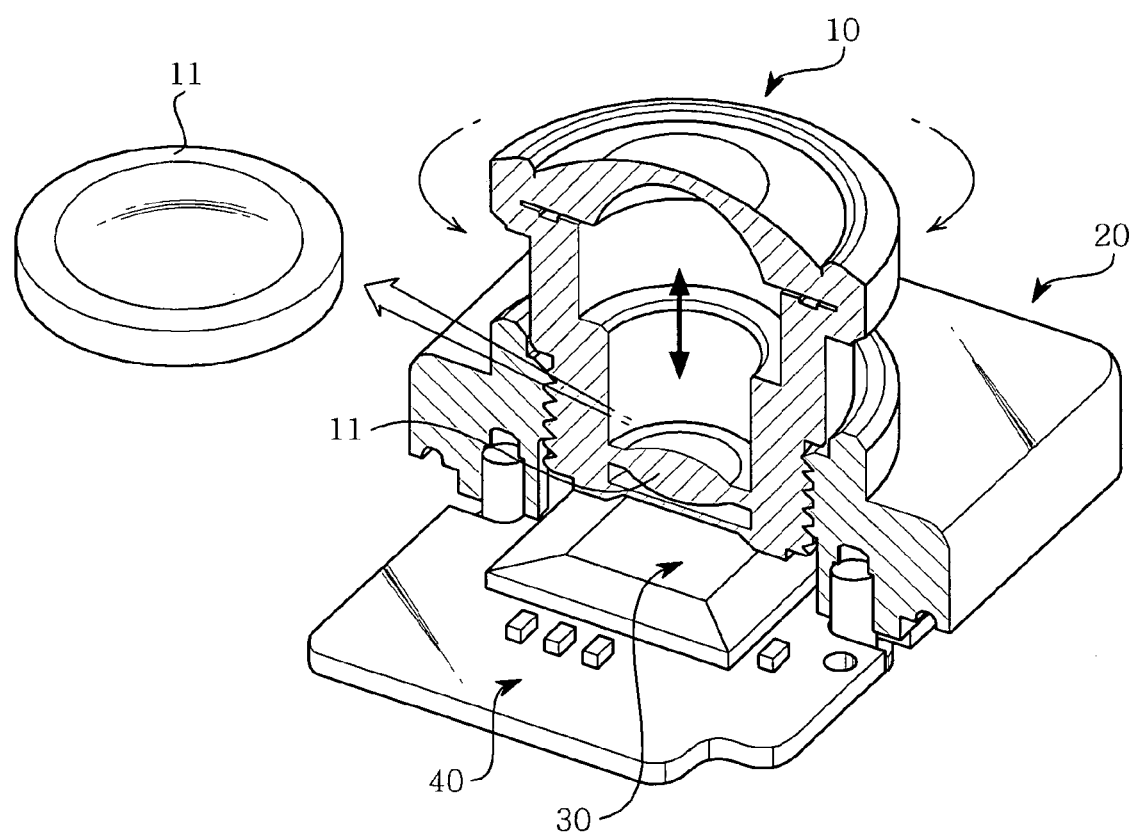
FIG. 5 is a perspective view illustrating a camera module according to a related art.

Hereinafter, a camera module with double barrels according to one embodiment of the invention will be described with reference to the accompanying drawings:

FIGS. 1 through 4 show the camera module 100 with double barrels according to the embodiment of the invention. The camera module 100 with double barrels includes a first lens barrel 110, a second lens barrel 120, a housing 130, an image sensor 140, and a circuit board 150.

The first lens barrel 110 is a barrel containing a plurality of lenses. At least one of the lenses may be a specific lens called anamorphic lens of which a shape is asymmetric with respect to a central axis. The first lens barrel 110 has a pin 121 at one side thereof and a protrusion 123 at an end portion thereof.

The pin 121 provided to the first lens barrel 110 transfers to the second lens barrel 120 the force generated when the first lens barrel 110 rotates. The pin 121 is inserted into an adjustment groove 122 of the second lens barrel 120 so that the second lens barrel 120 is rotated independently from the first lens barrel 119 when the first lens barrel 110 is rotated for focusing. The first lens barrel 110 is inserted into the second lens barrel 120 which surrounds a portion of the first barrel 110 so that the first and second lens barrels rotate independently. The horizontal adjustment of the asymmetric lens can be accomplished by independent rotations of the first barrel 110 and the second barrel 120.

The second barrel 120 is a barrel for focusing the lenses of the first lens barrel 110 and is provided so as to surround a portion of the first barrel 110. The second lens barrel 120 is provided with the adjustment groove 122 having a semicircular shape into which the pin 121 is inserted, an elastic piece 125, and notches 126. The outer surface of the second lens barrel 120 is provided with screw threads for enabling focusing of the first barrel. That is, the second lens barrel 120 has the first lens barrel 110 at a center portion thereof, engages with the outer surface of the first barrel 110 in a loose-fitting manner, and is inserted in a center portion of the housing 130. The screw threads of the inside surface of the housing 130 engage with the screw grooves of the outside surface of the second barrel 120 in a screwed manner.

The pin 121 provided to the first barrel 110 can pivot by 180° while it is inserted in the adjustment groove 122. The elastic piece 125 elastically deforms so that the first lens barrel 110 is easily inserted into the second lens barrel 120 and the notches 126 are provided at regular intervals to help the elastic piece 125 easily deform.

As described above, since the second lens barrel 120 is provided with the elastic piece 125 and the notches 126, the first lens barrel 110 is easily inserted into the second barrel 120, and the second lens barrel 120 may not separate easily from the first lens barrel 110 due to the protrusion 125 provided at the end portion of the first lens barrel 110.

The housing 130 has a box shape and surrounds the second lens barrel 120. The inside surface of the housing 130 engaging with the outer surface of the second lens barrel 120 is provided with screw grooves which engage with the screw threads of the second lens barrel 120. The housing 130 protects not only the lenses but also the image sensor 140 by being fixedly coupled to the circuit board 150 so as to support the second lens barrel 120.

The image sensor 140 is an element for converting an image of an object projected through the first lens barrel 110 to an electrical signal and is connected to an end of the circuit board 150 through a wire bonding method.

The circuit board 150 is a unit for transmitting the electrical signal generated by the image sensor 140 to electronic apparatuses, such as a vehicle-specific camera module and a camera phone. An upper surface of the circuit board 150 is provided with the image sensor 149 and circuits to which various passive elements are electrically connected. The circuit board 150 with the image sensor 140 on the upper surface thereof is in charge of electrical control of the camera module, and the housing 130 which is a rigid body encases all of the above-mentioned members of the camera module 100 for protection of the members of the camera module.

In the camera module 100 with double barrels according to the invention, at least one of the lenses embedded in the first lens barrel 110 is an asymmetric lens which is asymmetric with respect to a central axis, and is particularly an oval lens called anamorphic. Accordingly, after the second lens barrel 120 is coupled to the first barrel 110 in a manner such that the second lens barrel 120 surrounds the outer surface of the first lens barrel 110, the lenses are moved horizontally or vertically by rotation of the barrels. After that, the housing 130 is coupled to the outer surface of the second lens barrel 120 in a screwed manner so that the focusing of the lens of the camera is accomplished.

In greater detail, since the adjustment groove 122 has a semicircular shape, the first lens barrel 110 can be rotated by 180° and the position of the anamorphic lens is horizontally adjusted. Further, the focus of the lens is adjusted by rotating the second lens barrel 120 in a manner such that the pin 122 pushes the side wall of the adjustment groove and transfers the rotational force of the first lens barrel 110 to the second lens barrel 120. The pin 121 may be formed in a bar shape, a ring shape, or any other shape.

The protrusion 123 provided at the end portion of the first lens barrel 110 prevents the second lens barrel 120 from separating from the first lens barrel 110. The protrusion 123 may be formed in a ring shape, a nut shape, or a hook shape.

After the focusing and horizontal adjustment of the first lens barrel 110, the housing 130, the first lens barrel 110, and the second lens barrel 120 are bonded to one another to be integrated into the camera module and become a waterproof structure. The camera module 100 may be applied to a camera for a vehicle which must have high resolution or a security or monitoring camera for which focusing and resolution must be precisely adjusted.

The camera module 100 with double barrels according to the invention has a structure in which the first barrel 110 and the second barrel 120 are independently rotated for focusing of the lens. Accordingly, the camera module 100 prevents rotation phenomenon which is likely to occur in a camera module with the anamorphic lens having an asymmetric structure and prevents image loss from occurring. Furthermore, with the camera module 100, it is possible to easily adjust the focus of the lens.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A camera module with double barrels, which has an anamorphic lens structure, comprising:
    a first lens barrel containing a plurality of lenses and at least one anamorphic lens to focus an image of an object at a position inside the camera module;
    a second lens barrel surrounding a portion of the first lens barrel and separately rotating from the first lens barrel;
    a housing coupled in a screwed manner to the second lens barrel to focus of the first lens barrel; and
    a circuit board on which an image sensor to converting the image received by the first lens barrel to an electrical signal is provided and which is electrically connected to the camera module, and which is connected to a control portion of the camera module,
    wherein for movement of the anamorphic lens, the first lens barrel separately rotates from the second lens barrel, and to focus the first lens barrel, the second lens barrel moves in an optical axis direction of the lens,
    the first lens barrel comprising a circumferential protrusion at an end portion thereof to prevent the first lens barrel from separating from the second lens barrel,
    the second lens barrel comprising an elastic piece and a plurality of notches at an end portion of the elastic piece so that the first lens barrel is inserted into the second lens barrel, and
    the circumferential protrusion being fixed to the end portion of the elastic piece.

2. The camera module with double barrels according to claim 1, wherein the first lens barrel further comprises a pin which transfers to the second lens barrel force generated when the first lens barrel is rotated.

3. The camera module with double barrels according to claim 2, wherein the second lens barrel further comprises an adjustment groove into which the pin of the first lens barrel is inserted.

4. The camera module with double barrels according to claim 3, wherein the adjustment groove has a semicircular shape.

5. The camera module with double barrels according to claim 1, wherein the second lens barrel further comprises a plurality of screw threads to perform focusing.

6. The camera module with double barrels according to claim 1, wherein the first lens barrel; the second lens barrel, and the housing are bonded to one another after focusing of the lenses of the camera module is finished, so that the entire body of the camera module is unseparable and becomes waterproof.

* * * * *

UNITED STATES PATENT AND TRADEMARK OFFICE
CERTIFICATE OF CORRECTION

PATENT NO. : 8,208,210 B2  
APPLICATION NO. : 12/320992  
DATED : June 26, 2012  
INVENTOR(S) : Bok Sun An et al.

Page 1 of 1

It is certified that error appears in the above-identified patent and that said Letters Patent is hereby corrected as shown below:

Column 6, Line 15, In Claim 1, delete "converting" and insert -- convert --, therefor.
Column 6, Line 48, In Claim 6, delete "barrel;" and insert -- barrel, --, therefor.

Signed and Sealed this
Thirtieth Day of October, 2012

David J. Kappos
*Director of the United States Patent and Trademark Office*